(12) United States Patent
Hogari et al.

(10) Patent No.: US 8,698,457 B2
(45) Date of Patent: Apr. 15, 2014

(54) BATTERY PACK WITH PROTECTION CIRCUIT

(75) Inventors: Masaki Hogari, Fukushima (JP); Atushi Nakanouchi, Fukushima (JP)

(73) Assignee: Sony Corporation, Tokyo (JP)

( * ) Notice: Subject to any disclaimer, the term of this patent is extended or adjusted under 35 U.S.C. 154(b) by 208 days.

(21) Appl. No.: 12/889,750

(22) Filed: Sep. 24, 2010

(65) Prior Publication Data

US 2011/0080140 A1 Apr. 7, 2011

(30) Foreign Application Priority Data

Oct. 1, 2009 (JP) ................................ P2009-229915

(51) Int. Cl.
*H02J 7/00* (2006.01)
*H02J 7/04* (2006.01)

(52) U.S. Cl.
USPC ............ 320/134; 320/136; 320/152; 320/154

(58) Field of Classification Search
USPC .......................... 320/135, 136, 150–154, 134
See application file for complete search history.

(56) References Cited

U.S. PATENT DOCUMENTS

| 6,992,463 | B2 * | 1/2006 | Yoshio | 320/134 |
| 7,330,097 | B2 * | 2/2008 | Takeda | 337/102 |
| 7,649,340 | B2 * | 1/2010 | Sato et al. | 320/134 |
| 8,148,946 | B2 * | 4/2012 | Takeda et al. | 320/134 |
| 2007/0272525 | A1 | 11/2007 | Suzuki | |

FOREIGN PATENT DOCUMENTS

| JP | 2004-014434 | 1/2004 |
| JP | 2005-222834 | 8/2005 |
| JP | 2007-141572 | 6/2007 |
| JP | 2008-011597 | 1/2008 |
| JP | 2009-095162 | 4/2009 |
| JP | 2009-106007 | 5/2009 |
| JP | 2009-112113 | 5/2009 |
| JP | 2009-131023 | 6/2009 |

OTHER PUBLICATIONS

The State Intellectual Property Office of P.R.C., Notification of the Second Office Action, issued in connection with Chinese Patent Application No. 201010290109.5, dated Jul. 3, 2013. (14 pages).
Office Action issued in connection with Japanese Patent Application No. 2009-229915, dated Jan. 7, 2014. (5 pages.).

* cited by examiner

*Primary Examiner* — Richard V Muralidar
(74) *Attorney, Agent, or Firm* — K&L Gates LLP

(57) ABSTRACT

A battery pack includes a current control device that has a thermostat and a positive temperature coefficient device whose resistance increases as the temperature rises connected in parallel, the current control device being inserted into a discharge current path of a battery cell and a protection circuit that detects a voltage of the battery cell, detects an overcharge and over-discharge of the battery cell, and generates an over-charge detection signal and an over-discharge detection signal. In a normal state, a discharge current of the battery cell flows through the thermostat of the current control device. When the discharge current is large enough to damage the battery cell, the thermostat turns off and the discharge current flows through the positive temperature coefficient device. When the positive temperature coefficient device produces heat, a resistance of the positive temperature coefficient device increases and the discharge current is limited or interrupted.

10 Claims, 8 Drawing Sheets

BATTERY PACK WITH PROTECTION CIRCUIT

CROSS REFERENCES TO RELATED APPLICATIONS

The present application claims priority to Japanese Priority Patent Application JP 2009-229915 filed in the Japan Patent Office on Oct. 1, 2009, the entire content of which is hereby incorporated by reference.

BACKGROUND

The present application relates to a battery pack applied to a power source for power tools such as an electric drill, electric screwdriver, and electric disc grinder.

A lithium ion secondary battery (referred to below as a lithium ion battery as appropriate) that relies on doping and undoping of lithium ions is used as a power source (secondary battery) for power tools. The lithium ion battery has a positive electrode obtained by forming, on a positive electrode collector, a positive electrode active material layer that uses lithium composite oxides such as $LiCoO_2$ or $LiNiO_2$ and a negative electrode obtained by forming, on a negative electrode collector, a negative electrode active material layer that uses carbonaceous material such as graphite or non-graphitizable carbonaceous material capable of being doped or undoped with lithium. The positive electrode and negative electrode are laminated alternately with a separator disposed therebetween and bent or wound to be used as battery module. The battery module is housed in a metal can or laminate film together with nonaqueous electrolyte obtained by dissolving lithium salts in aprotic organic solvent to configure a battery.

A protection circuit is necessary to prevent lithium ion batteries from an overcharge, over-discharge, or overcurrent. Since a power tool consumes a relatively large current, protective devices with a high current capacity are necessary. However, FETs (field effect transistor), fuses, and other protective devices with a high current capacity are large in size and expensive. In addition, fuses blow to protect batteries, but they become unavailable again without being replaced.

Japanese Unexamined Patent Application Publication No. 2005-222834 proposes a switch that has an overcurrent protection function in which a mechanical switch and a positive temperature coefficient device (also referred to as a PTC thermistor) are combined. The PTC device has a low resistance at a relatively low temperature, but its resistance increases sharply above a certain temperature.

SUMMARY

In consideration of the above-described characteristics of a fuse, the current above which the fuse blows is likely to be set to a large value. As a result, the characteristics of the fuse are selected so that the fuse does not blow in the area where a lithium ion secondary battery is overloaded and it blows during occurrence of an overcurrent when, for example, the load is short-circuited. Accordingly, a problem with this protection function is that the security of a lithium ion secondary battery is not ensured completely even when a fuse is installed.

When a lithium ion secondary battery is used as the power source for power tools, it is likely that the current is controlled by a switching device such as a FET in the operation area where low or middle load is applied and direct connection to a load (for example, a brushless motor) is performed via the open/close contact by bypassing a switching device such as a FET in the operation area where high load is applied when the maximum power is necessary. In this type of configuration, when the load of an electric screwdriver becomes excessively large during operation and the motor stops turning, if the operator does not turn off the trigger switch for energization, the overcurrent almost the same as in a short-circuit of the coil continues flowing. As a result, the lithium ion secondary battery suffers damage such as a breakage of the lead electrode, a shrinkage of the separator, or a short-circuit due to melting of the separator. As described above, it is necessary for the user or operator to protect the lithium ion secondary battery from being overloaded.

When the lithium ion secondary battery suffers damage because the overcurrent almost the same as in a short-circuit of the load flows during occurrence of a lock of the motor, another method for ensuring the security is to detect damage (internal short-circuit) the next time the battery is charged, and interrupt charge current based on the detection. This method, however, may not surely detect the damage of the lithium ion secondary battery, so the protection of the battery becomes insufficient.

In the switch with the overcurrent protection function proposed in Japanese Unexamined Patent Application Publication No. 2005-222834, the PTC device is connected to the switch in series so that the PTC device can have a high resistance for overcurrent protection when an overcurrent flows. However, when an overcurrent is limited only by the PTC device, an overcurrent in power tools may not be prevented and damage to the lithium ion secondary battery may not be prevented reliably.

Accordingly, it is desirable to provide a battery pack in which compact and recoverable current control devices are used to reliably prevent damage to battery cells.

According to an embodiment, there is provided a current control device inserted into a discharge current path of a battery cell, the current control device having a thermostat and a positive temperature coefficient device whose resistance increases as the temperature rises, connected in parallel; a protection circuit that detects a voltage of the battery cell, detects an overcharge and an over-discharge of the battery cell, and generates an overcharge detection signal and an over-discharge detection signal; in which, in the current control device, a discharge current of the battery cell flows through the thermostat in a normal state, the thermostat turns off and the discharge current flows through the positive temperature coefficient device when the discharge current is large enough to damage the battery cell, and a resistance of the positive temperature coefficient device increases and the discharge current is limited or interrupted when the positive temperature coefficient device produces heat.

Preferably, a supply terminal for a charge current to the battery cell is disposed separately from an output terminal for a discharge current from the battery cell. In this case, a fuse for interrupting an excessive charge current is connected between the supply terminal for a charge current and the battery cell.

A switching device for protecting the battery cell from the overcharge and the over-discharge is attached to each of a charging unit and an application apparatus connected to the battery pack. In this case, the protection circuit includes a communication means used for communication between the charge apparatus and the application apparatus and the communication means transmits a signal for controlling the switching device.

The battery pack is used as a power source for a motor of a power tool.

According to the embodiment, it is possible to surely protect a secondary battery even in a compact shape by limiting or interrupting an overcurrent that flows during an overload such as when the motor of a power tool is locked. According to the embodiment of the present application, during recovery from an abnormal state (overload) to a successful state, a shift to the normal state is performed to enable reuse. Accordingly, it is possible to set an area in which a protective operation is enabled within an area in which damage to the battery cell by an overcurrent is reliably prevented.

Additional features and advantages are described herein, and will be apparent from the following Detailed Description and the figures.

DETAILED DESCRIPTION

An embodiment will now be described in the following order.

<1. Embodiment>
<2. Modification>

The following embodiment is a preferred specific example of the present application, on which various preferable limitations are imposed. However, the scope of the present application is not limited by the embodiment unless limitations to the present application are otherwise described.

1. Embodiment

"Example of a Power Tool"

Figure 1:
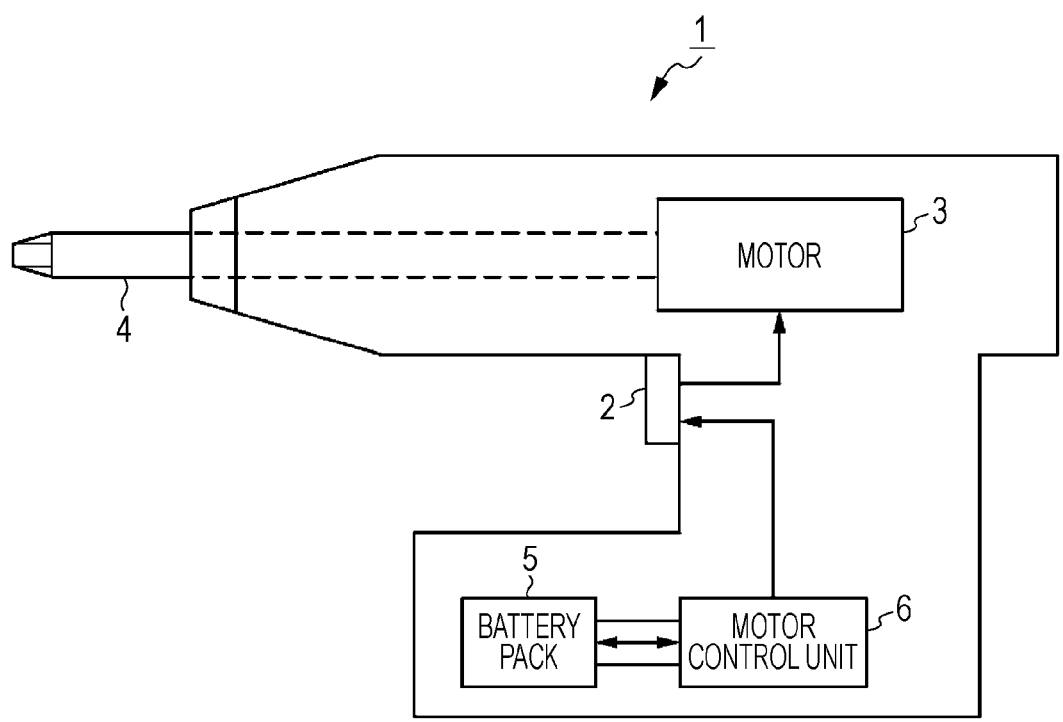
FIG. 1 is a block diagram showing a schematic structure of an electric screwdriver to which an embodiment is applicable.

An example of an electric screwdriver, which is a power tool to which the present application is applicable, will be schematically described with reference to FIG. 1. An electric screwdriver 1 incorporates a motor 3 such as a DC motor in its body. The rotation of the motor 3 is transferred to a shaft 4 and the shaft 4 turns screws. A trigger switch 2 is disposed on the electric screwdriver 1.

The electric screwdriver 1 has a battery pack 5 and a motor control unit 6 in the lower part of the handle. The engaging members (not shown) of the battery pack and the electric screwdriver 1 are engaged with each other. As described later, each of the battery pack 5 and the motor control unit 6 has a microcomputer. The battery pack 5 supplies battery power to the motor control unit 6 and the two microcomputers communicate with each other. The battery pack 5 of the electric screwdriver 1 is detachable and is attached to a charging unit when it is charged.

The motor control unit 6 controls the rotation/stop and the rotation direction of the motor 3. In addition, it interrupts power supplied to the load during an over-discharge. The trigger switch 2 is placed between the motor 3 and the motor control unit 6; when the operator presses the trigger switch 2, power is supplied to the motor 3 and the motor 3 turns. When the operator puts the trigger switch 2 in the original position, the motor 3 stops turning.

"Structure of the Circuit of the Battery Pack"

Figure 2:
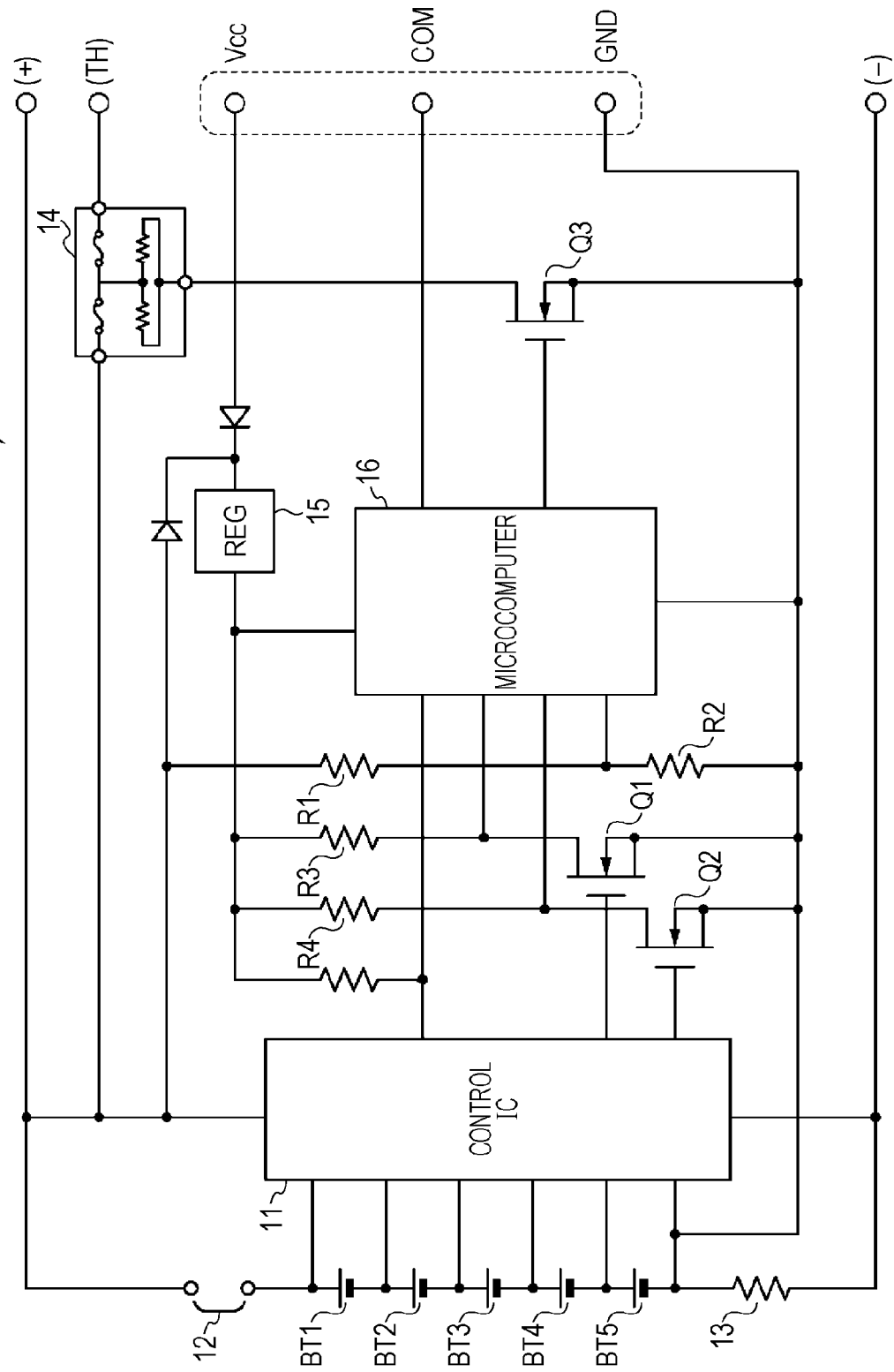
FIG. 2 is a connection diagram of an embodiment of a battery pack according to an embodiment.

The battery pack 5 is configured as shown in FIG. 2. In the battery pack 5, battery cells BT1, BT2, BT3, BT4, and BT5 (these battery cells are collectively called the battery cell BT when it is not necessary to identify these cells individually) of a secondary battery such as a lithium ion secondary battery are connected in series. If the full charge voltage of each battery cell is 4.2 V, the full charge voltage of the battery pack 5 according to the embodiment is 21 V.

The positive side of the battery cell BT is connected to the positive power terminal via the thermostat 12 with a PTC, which is a current control device, and the negative side of the battery cell BT is connected to the negative side power terminal via a resistor 13. Each voltage of the battery cell BT is measured by a control IC (integrated circuit) 11. The control IC 11 measures the charge current and discharge current of the battery cell BT. The voltage and current are automatically measured at predetermined intervals. A fuse 14 (for example, a chemical fuse) is placed between the positive side of the battery cell BT and a charge terminal TH.

A FET Q3, which is turned on or off by the microcomputer 16, is connected to a control terminal of the fuse 14. During an excessive overcharge, a signal from the output terminal of the control IC 11, that is connected to a resistor R4, is supplied to the microcomputer 16, the FET Q3 is turned on, and the fuse 14 blows.

A regulator 15 is disposed to form a stable direct voltage from the voltage of the battery cell BT. The output voltage of the regulator 15 is supplied to the microcomputer 16 and the control IC 11 and is output to a terminal Vcc. The negative side of the battery cell BT is connected to a terminal GND. Resistors R1 and R2 connected in series are placed between the positive side of the battery cell BT and the terminal GND and the voltage of the connection point between the resistors R1 and R2 is supplied to the microcomputer 16.

A resistor R3 and FET Q1 connected in series and the resistor R3 and a FET Q2 connected in series are placed between an output terminal of the regulator 15 and the terminal GND. The FETs Q1 and Q2 are turned on or off by the control IC 11. The FETs Q1, Q2, and Q3 are, for example, N-channel FETs. The FET Q1 is turned on by an overcharge detection signal output by the control IC 11. The FET Q2 is turned on by an over-discharge detection signal output by the control IC 11. The microcomputer 16 normally operates in a sleep state to save power consumption and shifts from the sleep state to a normal operation state when receiving a signal from the control IC 11.

The above battery pack 5 is attached to, for example, a charging unit (not shown) when it is charged and the microcomputer 16 in the battery pack 5 and the microcomputer in the charging unit communicate with each other via the terminal Vcc, a data communication terminal COM, and the terminal GND. When the battery pack 5 is attached to the electric screwdriver 1, the microcomputer 16 communicates with the microcomputer in the motor control unit 6 of the electric screwdriver 1.

During charging of the battery pack 5 where it is connected to the charging unit, certification is performed between the battery pack 5 and the charging unit. In the certification, for example, whether the battery pack and charging unit are authorized is checked. The certification is preferably performed for each cell of the battery pack 5. If certification is given, the same charging operation as in normal lithium ion batteries is performed by the charging unit.

During a discharge where the battery pack 5 is connected to an application apparatus such as a power tool, a signal is received or transmitted between the power tool and the battery pack 5. The signal is used to confirm the successful state and confirm that the voltage of the battery cell BT of the battery pack 5 is equal to or larger than a certain voltage. When the voltage is equal to or larger than the certain voltage, a discharge from the battery pack 5 starts.

"Thermostat with a PTC"

As shown in FIGS. 3A to 3D, the thermostat 12 with a PTC has a movable contact 21 and a fixed contact 22. The movable contact 21 is secured to a movable end of a bimetal 23. The fixed end of the bimetal 23 is secured to an input terminal 24. The bimetal 23 is created by combining two metal plates with different coefficients of thermal expansion and bends at a high temperature. The fixed contact 22 is secured to an output terminal 25. The structure in which the bimetal 23 is used to keep the contacts 21 and 22 in contact or away from each other is referred to as a thermostat. A PTC device 27, which is a positive temperature coefficient device, is disposed between a conductive supporting plate 26 connected to the input terminal 24 and a conductive supporting plate 28 connected to the output terminal 25. That is, between the input terminal 24 and the output terminal 25, there are a current path that goes through the thermostat including the bimetal 23 and a current path that goes through the PTC device 27 in parallel.

The outside shape of the thermostat 12 (not shown) with a PTC is a bar with a trapezoidal cross-section. Each of the battery cells BT1 to BT5 is a cylindrical lithium ion battery and these battery cells are tightly arranged to form a plane. The thermostat 12 with a PTC is placed in the space (valley) between adjacent batteries. As a result, even when the thermostat 12 with a PTC is used, it is possible to prevent the size of the battery pack from exceeding the cell hold size.

Figure 3A:
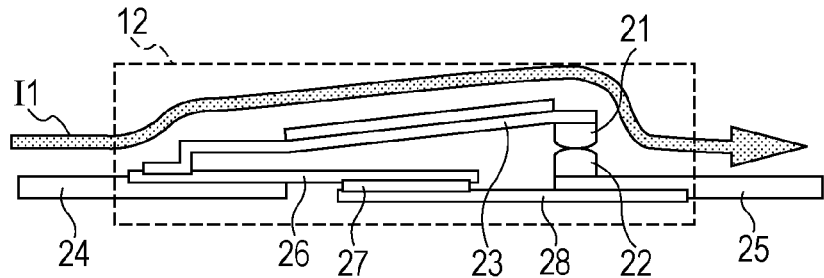
FIGS. 3A to 3D are schematic diagrams used to describe a thermostat with a PTC according to the embodiment.

This type of thermostat 12 with a PTC will be described below. In the normal discharge state (or charge state), the resistance of the bimetal 23 is much smaller than that of the PTC device 27, so current flows through the bimetal 23. If an overcurrent I1 flows through thermostat 12 with a PTC as shown in FIG. 3A due to a lock of the motor, the bimetal 23 produces heat due to the overcurrent I1.

Figure 3B:
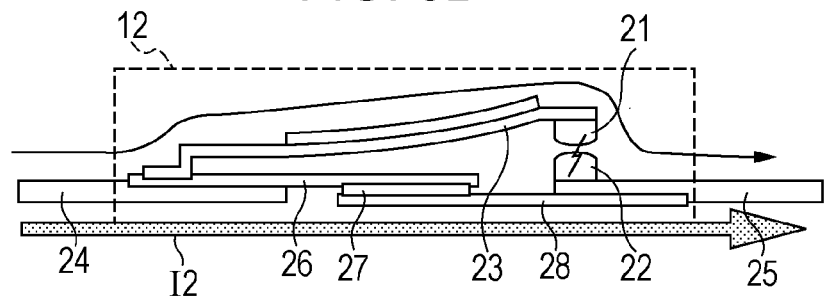

As shown in FIG. 3B, the bimetal 23 bends due to the produced heat and the movable contact 21 and the fixed contact 22 start separating from each other. If an overcurrent flows in this state, an arc discharge occurs between the contacts 21 and 22, possibly causing these contacts to be welded each other. However, when the contacts start separating from each other, a most part I2 of the overcurrent passes through the PTC device 27, which has a lower resistance, so the arc discharge is suppressed.

Figure 3C:
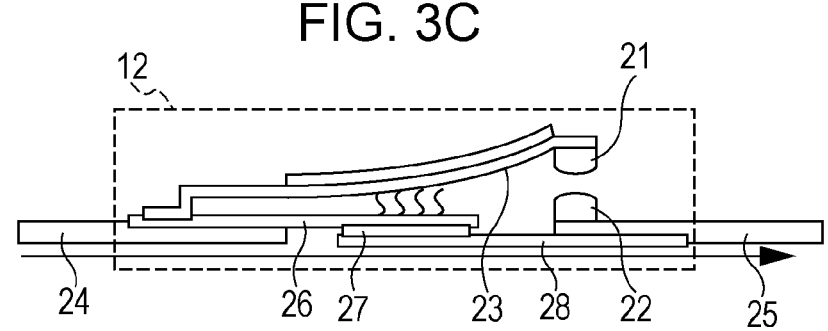

As shown in FIG. 3C, when the contacts are completely opened due to a bend of bimetal 23, the PTC device 27 produces heat due to the overcurrent I2 and the resistance of the PTC device 27 becomes higher. As a result, a current that flows through the PTC device 27 is limited or interrupted. A small leak current usually flows through the PTC device 27. As long as the overcurrent flows, the PTC device 27 maintains a high resistance and the bimetal 23 remains bent due to heat produced by the PTC device 27. If the PTC device 27 is not disposed, the contacts are opened and closed repeatedly due to changes in temperature, possibly causing chattering.

Figure 3D:
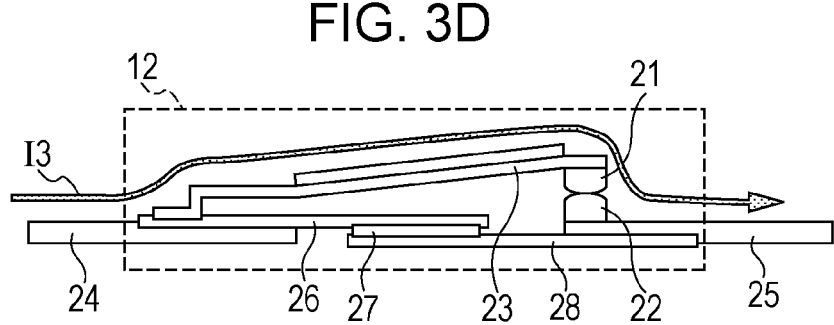

If the overcurrent is lost and a normal current I3 flows as shown in FIG. 3D, the temperature of the PTC device 27 is lowered and the resistance of the PTC device 27 is reduced. As a result, a bend of the bimetal 23 is released and the contacts 21 and 22 are placed in mutual contact. The normal current I3 flows through the bimetal 23 that has a sufficiently low resistance. As described above, this thermostat can not only interrupt an overcurrent but also achieve a return to the normal state.

"Optimization of the Thermostat with a PTC"

The lead electrode and separator of a battery cell are damaged when the amount of heat, which is defined by the product of the current value of an overcurrent and the time period in which the overcurrent flows, is large. The characteristics of the thermostat 12 with a PTC, which limits an overcurrent to prevent damage to the battery cell BT, can be determined on the basis of the results of measurement in which a plurality of samples of actually used battery cells are used. That is, many samples of battery cells are prepared, and whether each of the samples is damaged is checked by changing the discharge current and discharge time for each of the samples. It is preferable to check damage after performing a plurality of discharges.

Figure 4:
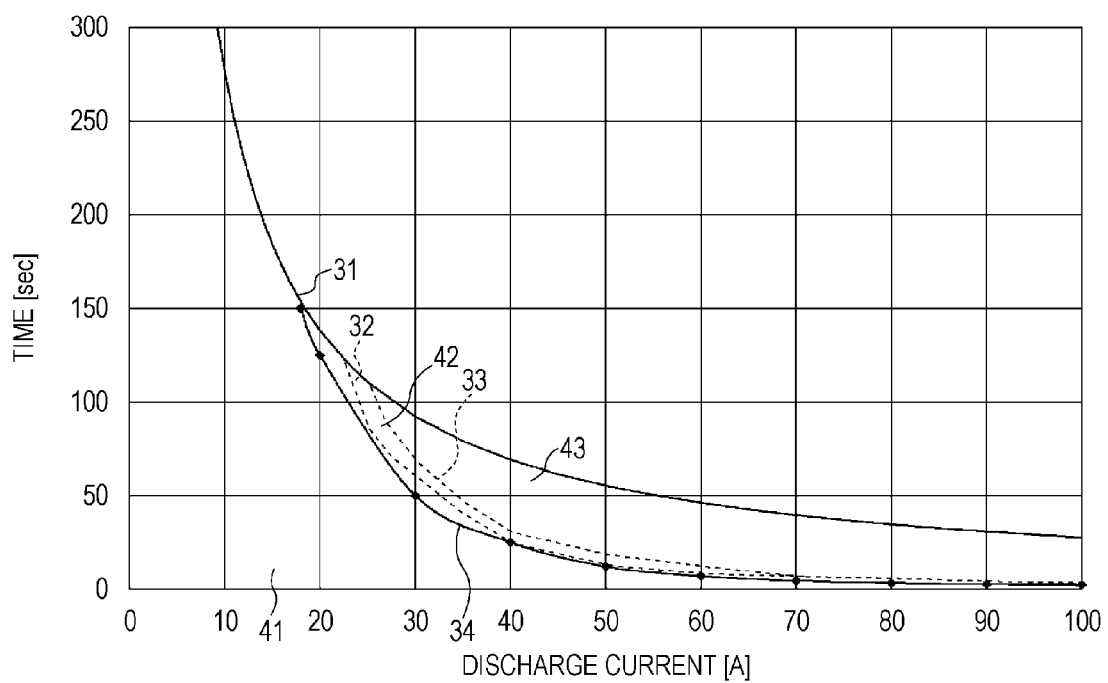
FIG. 4 is a schematic diagram showing an example of characteristics of the thermostat with a PTC according to the embodiment.

FIG. 4 is an example of an overload damage map for the lithium ion secondary battery (for example, a cylindrical type), obtained from the above measurement result. The horizontal axis indicates the discharge current (A) and the horizontal axis indicates the discharge time (second). The curve 31 indicates the case where the discharge rate is 100%. The area 41 inside the dotted curve 32 is a non-damage area. The area 42 between the dotted curve 32 and the dotted curve 33 is the area in which the battery cell may be damaged. For example, this area is a separator shrink area in which the separator of the battery cell shrinks. An area 43 between the dotted curve 33 and the curve 31 is the area in which the battery cell is damaged. For example, this area is a separator melt area in which the separator of the battery cell melts.

The thermostat 12 with a PTC limits an overcurrent by bending the bimetal 23 and (separation between contacts) and increasing the resistance of the PTC device 27, as described above. That is, there is an interruption time from the timing at which an overcurrent starts flowing to the timing at which an overcurrent is limited to a level lower enough for the overcurrent to give no effects. In consideration of variations in measurement, the characteristics of the interruption time of the thermostat 12 with a PTC are set so as to achieve "the characteristics of discharge current versus discharge time" indicated by the curve 34 placed slightly lower than the dotted curve 32 in FIG. 4. The dotted line 32 defines the border between the non-damage area 41 and the separator shrink area 42, so damage to the battery cell can be prevented by the characteristics of the curve 34. The setting of the interruption time of the thermostat 12 with a PTC is possible by setting the characteristics defined by the thickness etc. of the bimetal 23 and the characteristics of the PTC device 27.

"Protective Operation"

Figure 5:
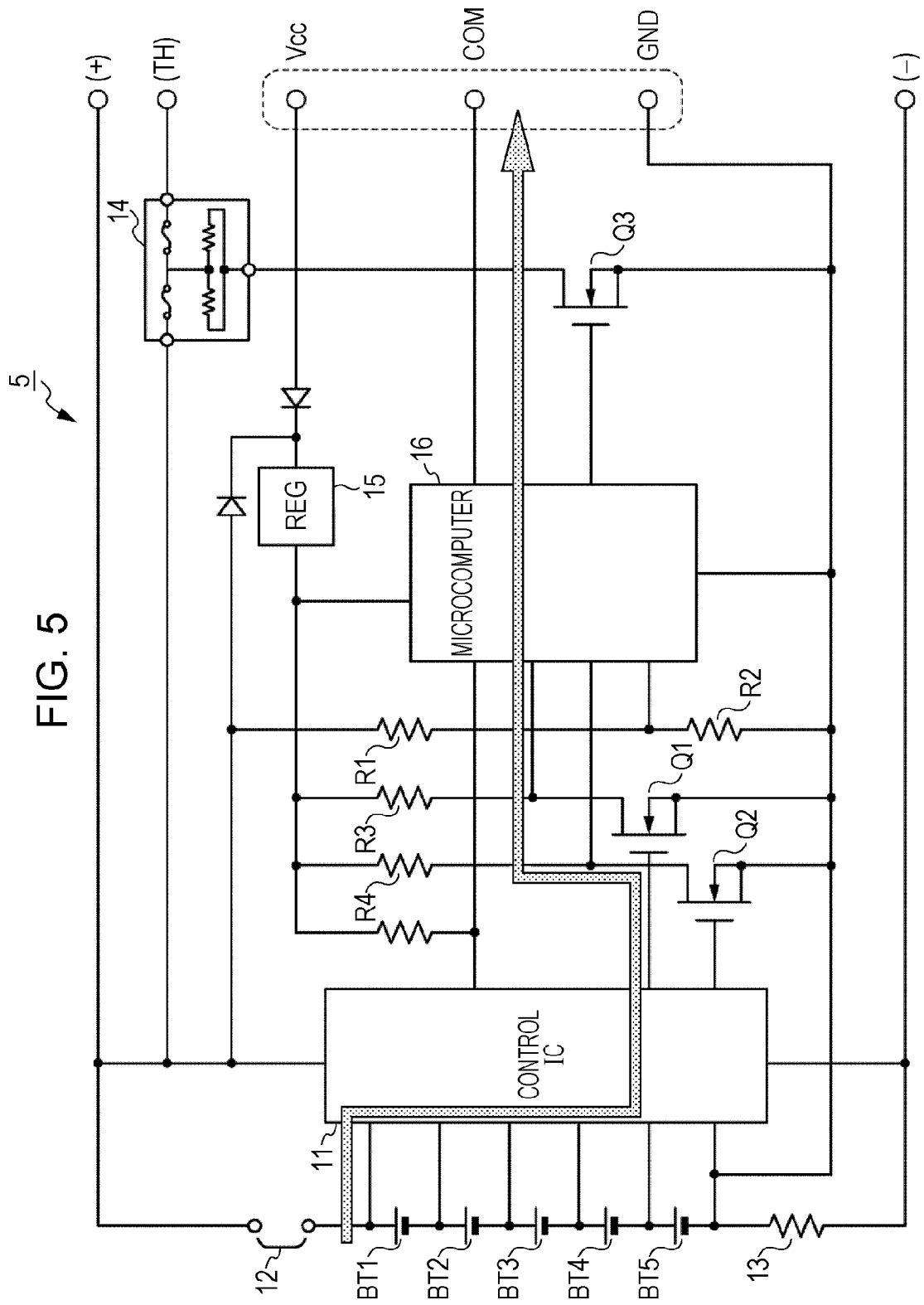
FIG. 5 is a connection diagram showing protective operation against an overcharge according to the embodiment.

In the embodiment, based on the measurement results of the voltage and current detected by the control IC 11, protective operation for protecting the battery cell BT from an overcharge, over-discharge, and overcurrent is performed. Protective operation against an overcharge will be described with reference to FIG. 5. The overcharge detection voltage of the battery cell BT is determined as, for example, 4.2 V±0.5 V. If the control IC 11 detects that the voltages of the battery cells BT2 to BT5 are 4.1 V and the voltage of the battery cell BT1 is 4.4 V, the FET Q1 is turned on by an output of the control IC 11.

Figure 6:
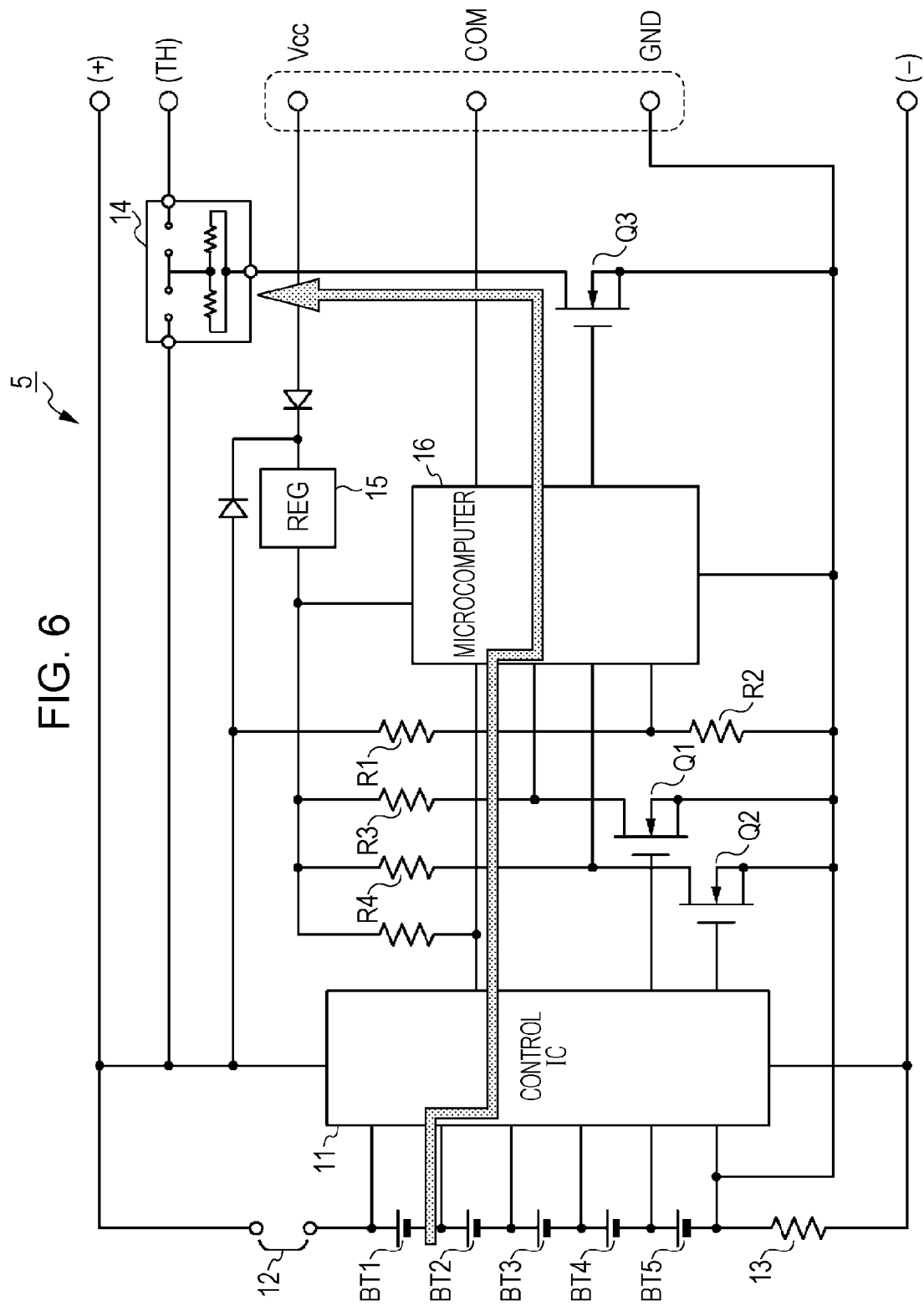
FIG. 6 is a connection diagram showing protective operation against an excessive overcharge according to the embodiment.

The microcomputer 16 receives a change of the drain voltage caused when the FET Q1 turns on and is notified of an overcurrent. The microcomputer 16 sends data for instructing the interruption of the charge current to the microcomputer in the charging unit via a data communication terminal COM. The microcomputer in the charging unit receives this data and enables a charge current interruption switch in the charging unit. As a result, the charging current for the battery pack 5 is interrupted Next, protective operation against an extreme overcharge (referred to below as an excessive overcharge) will be described with reference to FIG. 6. For example, the control IC 11 detects that the voltages of the battery cells BT1 and BT3 to BT5 are 4.1 V and the voltage of the battery cell BT2 is 4.5 V. The control IC 11 detects an excessive overcharge and supplies an excessive overcharge detection signal to the microcomputer 16. The FET Q3 is turned on by an output from the microcomputer 16. An excessive overcharge is a permanent failure mode; the fuse 14 blows when the FET Q3 turns on. The battery pack 5 having the blown fuse 14 is a disabled product, which is unavailable.

Figure 7:
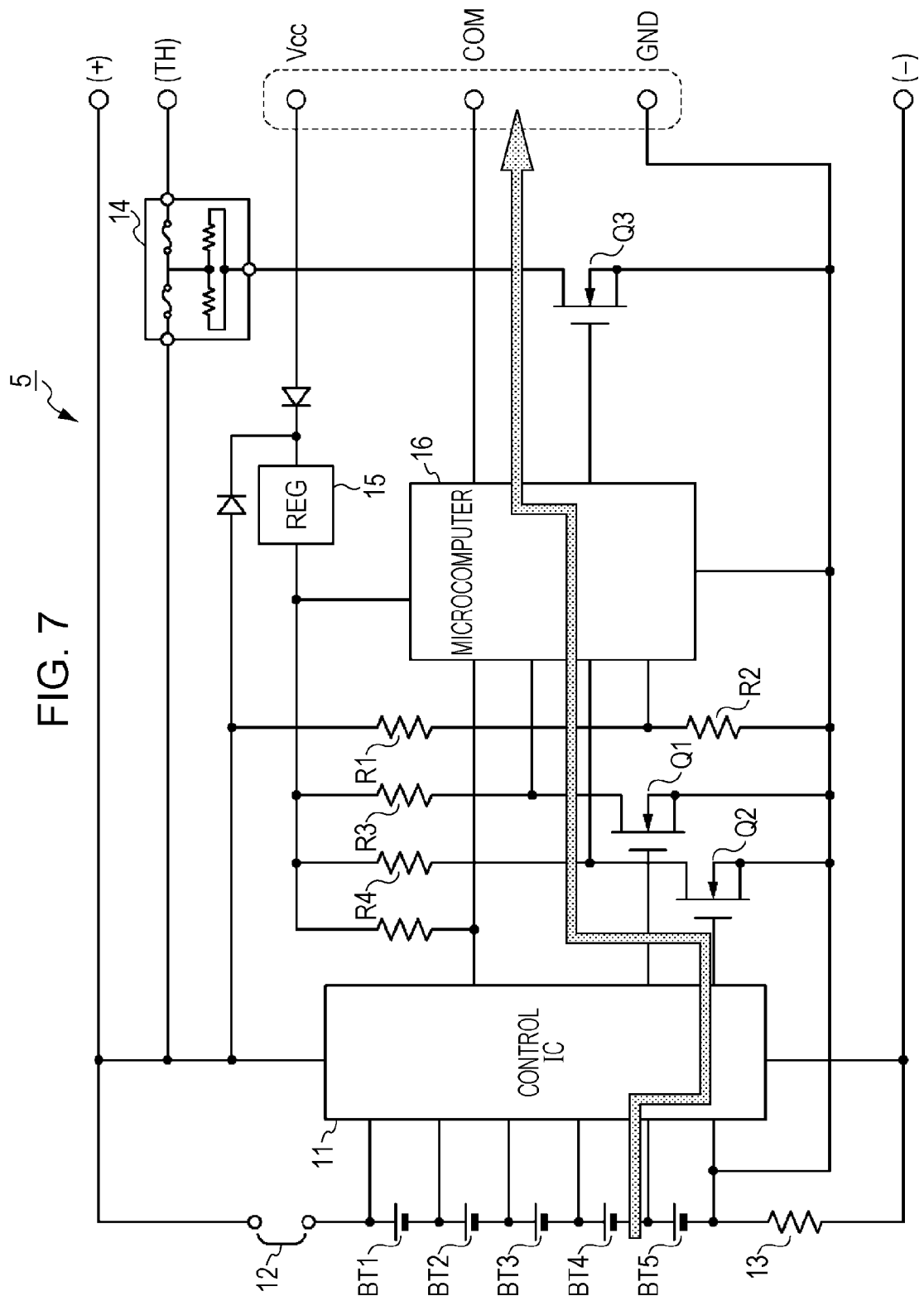
FIG. 7 is a connection diagram showing protective operation against an excessive overcharge according to the embodiment.

Next, protective operation against an over-discharge will be described with reference to FIG. 7. The control IC 11 detects that the voltage of any of the battery cells BT1 to BT5 is equal to or lower than an over-discharge detection voltage. The over-discharge detection voltage is specified as, for example, 2.4 V±0.1 V. For example, the control IC 11 detects that the voltages of the battery cells BT1 to BT4 are 2.8 V and the voltage of the battery cell BT5 is 1.6 V. The FET Q2 is turned on by an output from the control IC 11.

The microcomputer 16 receives a change of the drain voltage caused when the FET Q2 turns on and is notified of an over-discharge. The microcomputer 16 sends data or a signal for instructing the interruption of the discharge current to the microcomputer in the motor control unit 6 of the electric screwdriver 1 via the data communication terminal COM. The microcomputer in the motor control unit 6 receives this data or signal and enables a discharge current interruption switch in the motor control unit 6 to interrupt the discharge current.

Figure 8:
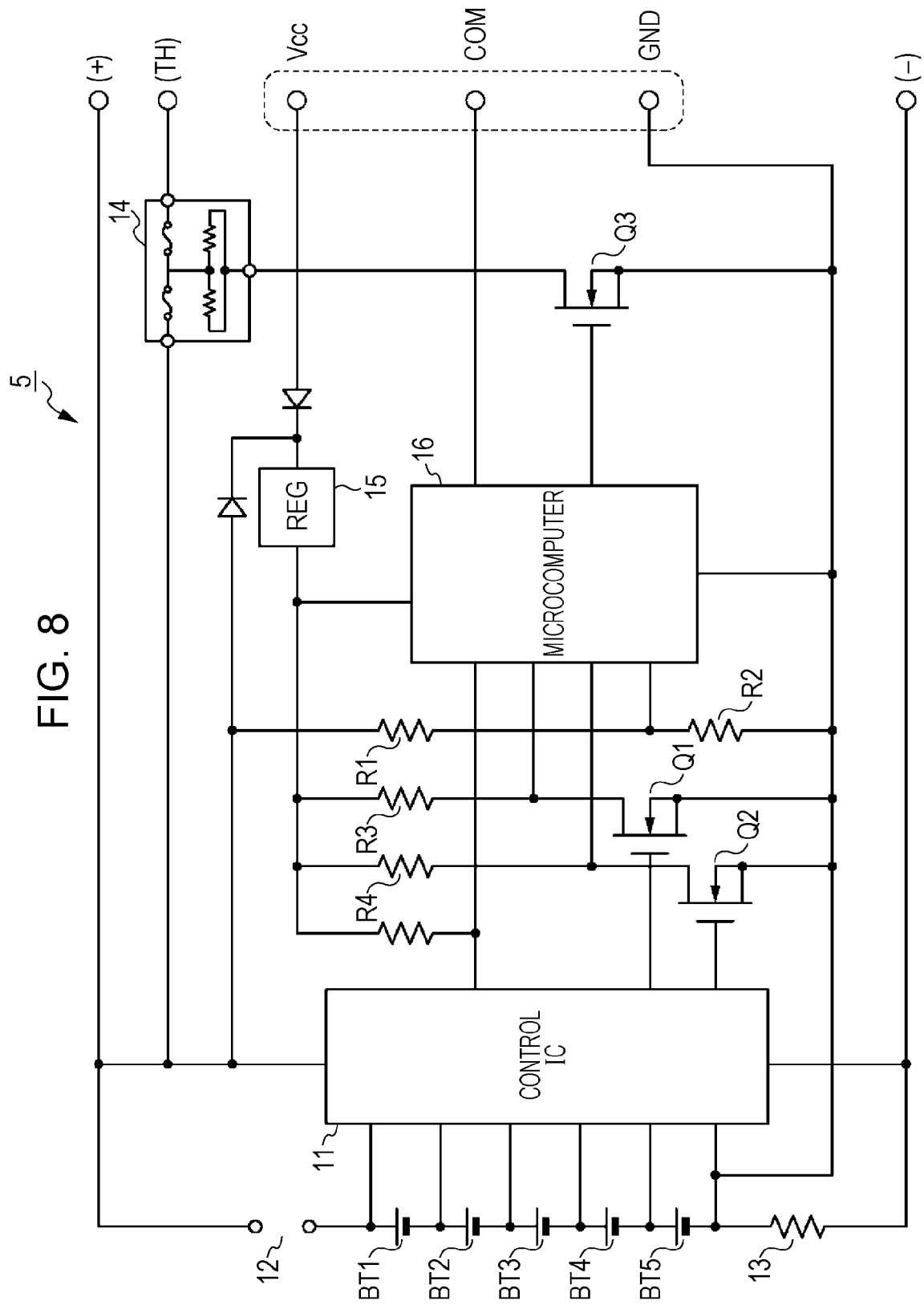
FIG. 8 is a connection diagram showing protective operation against an overcurrent according to the embodiment.

Next, the rotation of the motor 3 of the electric screwdriver 1 is locked, the same overcurrent (for example, 20 A) as in a short-circuit of the coil is produced. Since the characteristics of the thermostat 12 with a PTC are set as shown in FIG. 4, the discharge current is limited by the thermostat 12 with a PTC approximately 125 seconds after an overcurrent starts flowing. FIG. 8 shows the limitation of the discharge current by the thermostat 12 with a PTC. When the overcurrent stops flowing and the temperature of the bimetal 23 is lowered, the contacts are placed in mutual contact and a return to the normal state is made. The fuse 14 is connected to a charge terminal TH and the charge terminal TH is opened during discharging, so the fuse 14 does not blow due to an overcurrent during discharging.

3. Modification

The embodiment is specifically described above, but the present application is not limited to the above embodiment and various modifications are allowed on the basis of technical ideas of the present application. For example, a switching device (FET) against an overcharge or over-discharge may be disposed within the battery pack. In addition, a device with positive temperature characteristics may be used instead of the PTC device. Battery cells may be arranged in parallel or in series-parallel instead of in series.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery pack comprising:
    a plurality of battery cells connected in series;
    a current control device including a thermostat with a bimetal and a positive temperature coefficient device whose resistance increases as the temperature rises, the bimetal and the positive temperature coefficient device being connected in parallel, and the current control device being inserted into a discharge current path of a battery cell;
    a fuse coupled between the current control device and a supply terminal for a charge current to the battery cell;
    a control IC configured to measure a voltage of each of the battery cells, wherein the control IC generates an overcharge detection signal and an excessive overcharge detection signal when the measured voltage exceeds an overcharge detection voltage and an excessive overcharge detection voltage of the battery cells, respectively; and
    a microcomputer coupled to the control IC and configured to send data to a charging unit via a data communication terminal for instructing the charging unit to interrupt the charge current upon receiving the overcharge detection signal, wherein the microcomputer causes the fuse to be blown to protect the battery pack upon receiving the excessive overcharge detection signal, and
    wherein, in the current control device, a discharge current of the battery cell flows through the thermostat in a normal state, the thermostat turns off and the discharge current flows through the positive temperature coefficient device when the discharge current is large enough to damage the battery cell, and a resistance of the positive temperature coefficient device increases and the discharge current is limited or interrupted when the positive temperature coefficient device produces heat.

2. The battery pack according to claim 1, wherein the supply terminal for a charge current to the battery cell is disposed separately from an output terminal for a discharge current from the battery cell.

3. The battery pack according to claim 2, wherein the fuse for interrupting an excessive charge current is connected between the supply terminal for the charge current and the battery cell.

4. The battery pack according to claim 1, wherein a switching device for protecting the battery cell from the overcharge and the over-discharge is attached to each of the charging unit and an application apparatus connected to the battery pack.

5. The battery pack according to claim 4, wherein the the battery pack includes a communication means for performing communication between the charging unit and the application apparatus, the communication means for transmitting a signal for controlling the switching device.

6. The battery pack according to claim 1 used as a power source for a motor of a power tool.

7. The battery pack according to claim 1, wherein a regulator forming a stable direct voltage from a voltage of the battery cell is disposed.

8. The battery pack according to claim 1, wherein the microcomputer normally operates in a sleep state to save power consumption and shifts from the sleep state to a normal operation state when receiving a signal from the control IC.

9. The battery pack according to claim 4, further comprising a first FET, a second FET, and third FET, wherein the first FET, the second FET, and the third FET are disposed as the switching device, the first FET being turned on by the overcharge detection signal output by the control IC, the second FET being turned on by an over-discharge detection signal output by the control IC, and the third FET being turned on and off by the microcomputer.

10. The battery pack according to claim 5, wherein the communication unit performs certification between the battery pack and the charging unit when the battery pack is connected to the charging unit for charging.

* * * * *